United States Patent
Kwon

[19]

[11] Patent Number: 6,039,500
[45] Date of Patent: Mar. 21, 2000

[54] QUICK CHANGE SIDE FULL HOIST RING ASSEMBLY

[76] Inventor: Yong Chin Kwon, 1901 Mora Ct. Apt. 201, Schaumburg, Ill. 60193

[21] Appl. No.: 09/072,823

[22] Filed: May 5, 1998

[51] Int. Cl.[7] .................................................. F16D 1/12
[52] U.S. Cl. .......................... 403/78; 403/319; 403/318; 294/1.1; 294/82.1
[58] Field of Search ................. 403/78, 164, 79, 403/165, 157, 150, 319, 353, 318; 294/1.1, 82.1

[56] References Cited

U.S. PATENT DOCUMENTS

| | | | |
|---|---|---|---|
| 3,628,820 | 12/1971 | Blatt | 294/82.1 |
| 4,570,987 | 2/1986 | Wong et al. | 294/1.1 |
| 4,592,686 | 6/1986 | Andrews | 294/1.1 |
| 4,705,422 | 11/1987 | Tsui et al. | 294/1.1 |
| 5,125,861 | 6/1992 | Freeman | 294/82.1 |
| 5,823,588 | 10/1998 | Morghen | 294/1.1 |

FOREIGN PATENT DOCUMENTS

WO 87/00823  2/1987  WIPO ...................................... 294/89

Primary Examiner—Lynne H. Browne
Assistant Examiner—Kenneth Thompson
Attorney, Agent, or Firm—Dillis V. Allen, Esq.

[57] ABSTRACT

A hoist ring assembly for transporting loads, including an anchor bushing that is threaded into the load and forms the pivot for a releasable swivel hanger assembly with a shackle connectable to an overhead hoist. The swivel hanger is quickly attachable to and detachable from the anchor bushing to expedite load movement. The hanger swivels on the anchor bushing in a side-pull action and has a key hole slot that hangs the anchor bushing during use and permits the hanger to be rapidly removed from the anchor bushing when the hoist is slack. A latch lever holds the hanger in its attached position on the anchor bushing when unloaded and is quickly flipped out of the way for swivel hanger removal.

12 Claims, 4 Drawing Sheets

QUICK CHANGE SIDE FULL HOIST RING ASSEMBLY

BACKGROUND OF THE INVENTION

Swivel shackle assemblies have been used for many years in conjunction with cables and a hoist to lift and move heavy objects about the workplace, such as dies, molds, heavy castings, etc. These swivel shackle assemblies typically include a "U" shaped shackle member that is pivotal on a swivel body that in turn is rotatable about an axis on a base that is perpendicular to the swivel axis of the shackle on the base. This enables the shackle to accommodate two axes pivotal movement which is necessary for the geometry of the hoist arrangement.

In a typical hoist arrangement, an overhead crane has a depending single cable that is tied to four(more or less) outwardly extending cables connected to the shackle assemblies. Each shackle assembly typically has a threaded fastener extending centrally there-through that bolts the shackle directly to the top surface of the die or mold.

The following patents are representative of the prior art relating to dual axis hoist shackle assemblies.

The Andrewe, et al., U.S. Pat. No. 3,297,293, issued Jan. 10, 1967; the Tsui, et al., U.S. Pat. No. 4,705,422, issued Nov. 10, 1987; and the Chandler, U.S. Pat. No. 5,352,056, issued Oct. 4, 1994, all show swivel shackle assemblies having a "U" shaped member or shackle that is pinned to a rotary swivel member by transverse pins that are separate from the "U" member itself. In this design, it is necessary to fix these shackle pins in the swivel body.

A second group of patents represented by the Wong, et al., U.S. Pat. No. 4,570,987, issued Feb. 18, 1996; the Tsui, et al., U.S. Pat. No. 4,641,986, issued Feb. 10, 1987; and the Tsui, U.S. Pat. No. 5,405,210, issued Apr. 11, 1995, show hoist swivel shackle assemblies in which the ends of the "U" shaped shackle extend radially inwardly and form the pivotal bosses for the shackle on the swivel body member. This design somewhat reduces the long term loading problem on the shackle discussed above, but it does not significantly minimize that problem.

The Mueller, U.S. Pat. No. 3,492,033, discloses a clevis assembly with a locking ring 48 for locking the stud to the load. Mueller's clevis is not easily disassembled, however.

The Brawand, U.S. Pat. No. 3,163,901, shows a cargo hook and chain device in which a line holder 14 is detachable from member 10 and adapted to hold one or more load cables 16. The line holder 14 has an arcuate slot that permits its removal from a swivel-type draft line terminal member 10. There is no significant savings in the Brawand device because the line holding member 14 is a simple inexpensive loop-shape member.

The Blatt, U.S. Pat. No. 3,628,820, shows a side pull type swivel-type hoist ring assembly in which the hoist ring is generally perpendicular to the axis of the shoulder screw 28. Blatt's retaining ring 22 and block 12 are not readily removable from the screw 28.

The Bateman, U.S. Pat. No. 1,321,356, shows an anchor shank and shackle in which the shackle itself is removable from the anchor shank 9. However, the anchor shank 9 is not a swivel-type anchor shank and the removal of the shackle by itself results in no significant savings or benefits.

The Jergens Manufacturing Co. makes a line of side pull style hoist rings identified as part numbers 47311 to 47319 that have extra-large diameter rings and generally U-shaped swivel members. The swivel members, however, cannot be removed from the load without removing the anchor bushing itself.

It is a primary object of the present invention to ameliorate the problems noted above and provide a side pull hoist ring assembly with an easily removable swivel and shackle.

SUMMARY OF THE PRESENT INVENTION

In accordance with the present invention, a side pull hoist ring assembly is provided for transporting loads including an anchor bushing that is threaded into the load and forms the pivot for a releasable hanger assembly with a shackle connectable to an overhead hoist. The hanger is quickly attachable and detachable from the anchor bushing to expedite load movement. The hanger swivels on the anchor bushing in a side pull action and has a key hole slot that hangs the anchor bushing during use and permits the hanger to be rapidly removed from the anchor bushing when the hoist is slacked by shifting a latch lever out of the way and lowering the swivel hanger to the large portion of the key hole slot that enables removal of the swivel hanger. The latch lever holds the hanger on the anchor bushing when the swivel hanger is unloaded.

Because the shackle and swivel hanger assembly is readily removable from the anchor bushing, new methods of use become feasible. For example, when moving multiple loads from position A to position B, worker number 1 begins attaching four anchor bushings to each of the loads. While he is doing this, worker number 2 installs four swivel hanger and shackle assemblies to the first load finished by worker number 1, connects the cooler and hoist and moves the first load to position B. He then quickly releases the four swivel hangers and returns them with the hoist to position A where he attaches the same four swivel hangers to the previously installed anchor bushings on the second load and repeats the hoisting.

The benefits of this process, which result directly from the design of the present hoist ring assembly, are firstly a much faster load transfer because the anchor bushing installation time does not reduce multiple load total travel time. Plus, the user needs fewer swivel hanger and shackle assemblies and can purchase many more anchor bushings than swivel hangers at a substantial cost saving because the anchor bushings are substantially less costly than the swivel hanger and shackle assemblies.

Other objects and advantages of the present invention will appear more clearly from the following detailed description.

DETAILED DESCRIPTION OF THE PREFERRED EMBODIMENT

Figure 1:
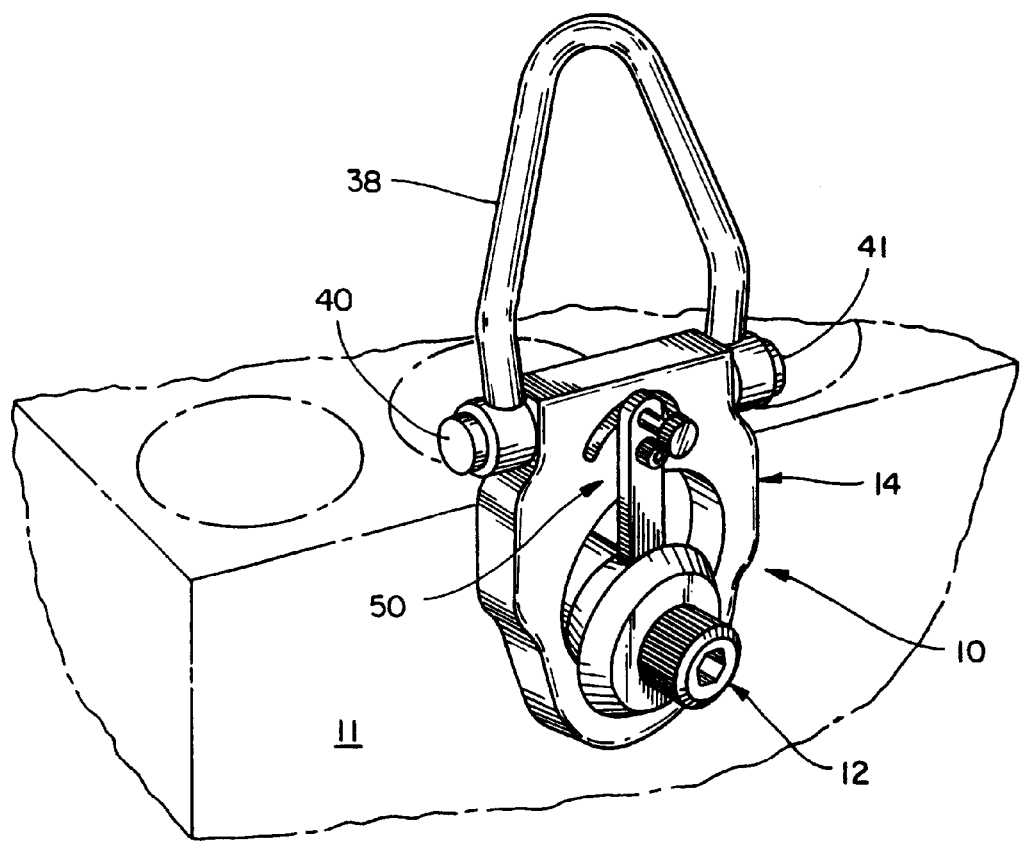
FIG. 1 is a perspective view of the present side pull hoist ring assembly attached to the side of a fragmented load.

Referring to the drawings and particularly FIGS. 1 to 6, the present side pull hoist ring assembly 10, shown attached to a load 11 in FIG. 1, is seen to generally include an anchor bushing assembly 12 and a shackle and swivel hanger assembly 14.

Figure 2:
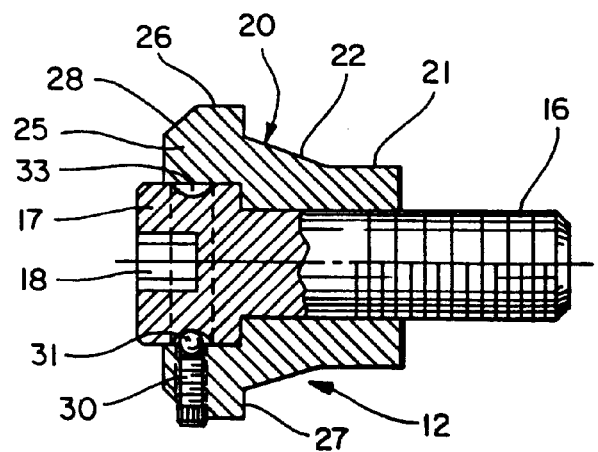
FIG. 2 is a longitudinal section through the anchor bushing assembly.

As seen in FIG. 2, the anchor bushing assembly 12 includes a threaded stud 16 having an enlarged head 17 with a tool socket 18. A collar 20 is received on the stud 16, and it has a reduced outer angular surface 21 adjacent an intermediate frusto-conical surface 22 and an enlarged head portion 25 with an outer annular surface 26 defining a shoulder 27 and a frusto-conical forward surface 28.

The collar 20 is held in the assembled position with respect to stud 16 by a detent assembly that includes side screw 30 having an end that engages ball 31 and holds it in annular outer groove 33 in stud head 17.

Figure 3:
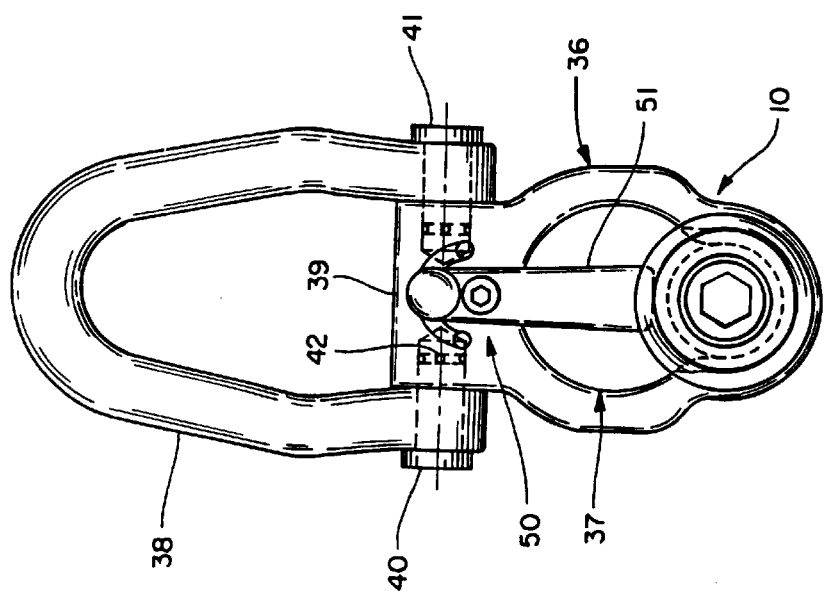
FIG. 3 is a front view of the hoist ring assembly illustrated in FIG. 1.

As seen in FIG. 3, the swivel hanger and shackle assembly 14 is seen to include a swivel hanger 36 with a key hole slot 37 there-through and a U-shaped shackle 38 that points on an upper portion 39 of the swivel hanger 36 by swivel pins 40 and 41. Swivel pins 40 and 41 are held axially in position by roll pins 42.

Figure 5:
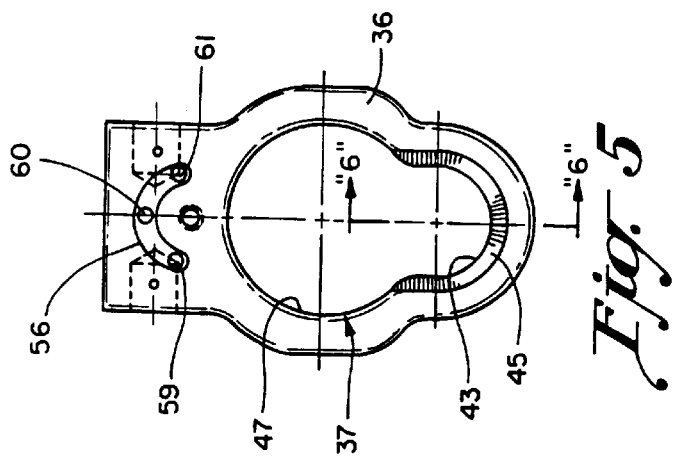
FIG. 5 is a sub-assembly front view of the swivel hanger.
Figure 6:
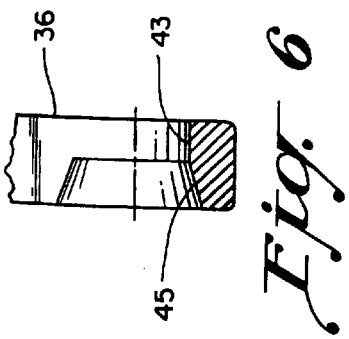
FIG. 6 is a fragmentary vertical section through the swivel hanger along line 6—6 of FIG. 5.
Figure 4:
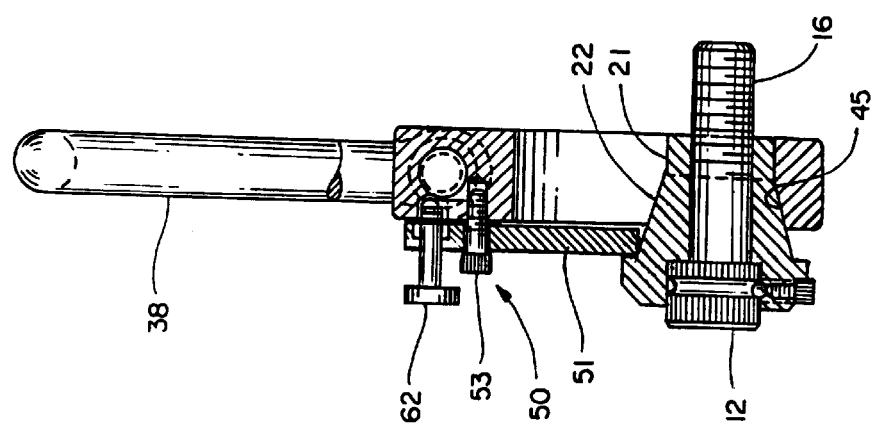
FIG. 4 is a vertical section through the hoist ring assembly illustrated in FIGS. 1 and 3.

As seen in FIG. 5, the swivel hanger 36 is generally loop-shaped, and key slot 37 includes an annular lower slot portion 43 that closely fits around and is complementary in shape to the outer surfaces 21 and 22 of the collar 20, as seen clearly in FIG. 4. Slot 43 includes a frusto-conical forward portion 45 that engages frusto-conical surface 22 to its shoulder 27 on the collar that axially fix the swivel hanger 36 with respect to the anchor bushing. Key hole slot 37 includes an upper semi-circular portion 47 that has a diameter greater than the anchor bushing to permit the swivel hanger to pass over and removed from the anchor bushing when the hanger slot portion 47 is coaxial with the anchor bushing.

Figures 8, 9:
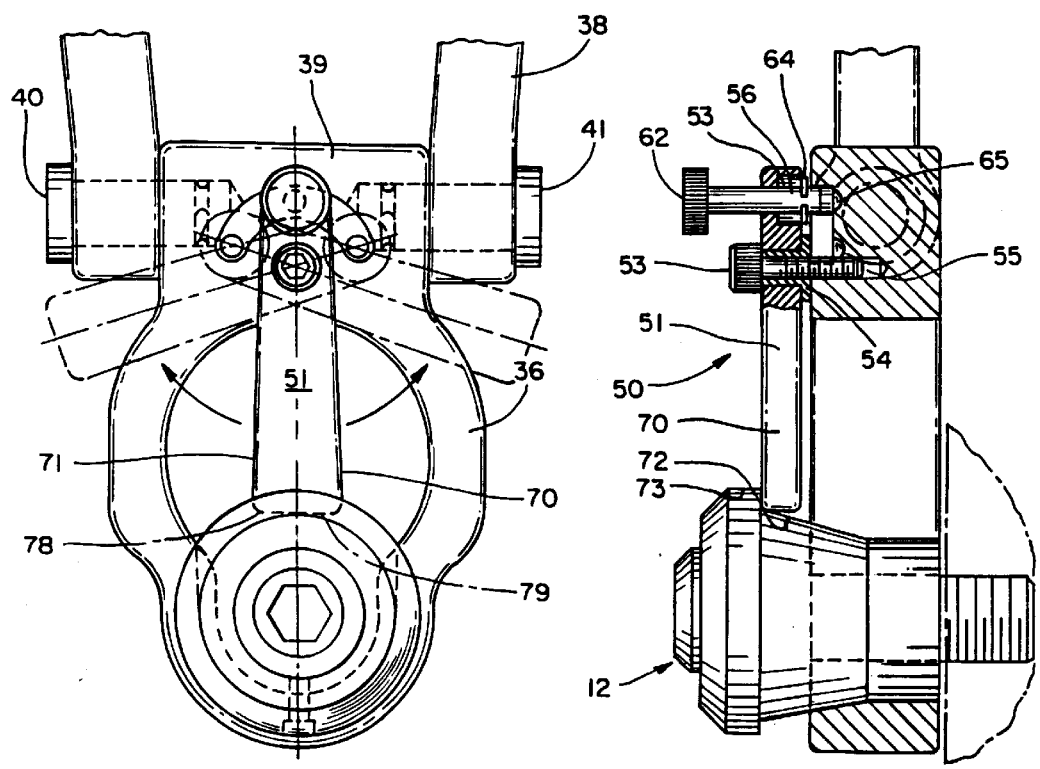
FIG. 8 is a fragmented and enlarged front view of the hoist ring assembly showing the two side shifted positions of the latching lever in phantom.
FIG. 9 is a fragmented section of the hoist ring assembly illustrated in FIG. 8.

As seen more clearly in FIGS. 8 and 9, a latch assembly 50 is provided for locating the swivel hanger assembly 14 on the anchor bushing 12 prior to attachment to the hoist and after release from the hoist. After it is attached to the hoist, of course, the upward vertical load imposed upon the swivel hanger by the hoist through the shackle maintains the swivel hanger in its seated position shown in FIGS. 8 and 9, although angular swiveled to accommodate the geometry of the hoist cables.

But prior to the hoisting and during the installation process and the hoist release time of the swivel hanger, the latch assembly 50 serves to properly seat the swivel hanger with respect to the anchor bushing 12.

Towards these ends, the latch assembly 50 includes an elongated lever 51 pivoted to upper portion 39 of the swivel hanger 36 by threaded member 53 that extends through a bushing 54 and into a threaded aperture 55 in the upper portion 39 of the swivel hanger. An arcuate slot 56 is formed in the face of the swivel hanger 36 about the axis of the threaded member 53, and it receives a spring biased ball assembly 56 that seats in one of three hemispherical recesses 59, 60 and 61 in recess 56 that define the three positions for the latch assembly 50 illustrated in FIG. 8. Ball detent 56 includes a thumb headed shaft 62 and a spring 63 that engages a snap ring 64 to urge ball 65 toward the slot 56. In this way the ball snaps into one of the spheroidal recesses 59, 60, and 61 to define the three fixed positions for the latch assembly 50.

In use, the operator pulls the shaft 62 outwardly and then shifts the latching assembly 50 in either direction depending upon what is convenient at that particular time.

Figure 7:
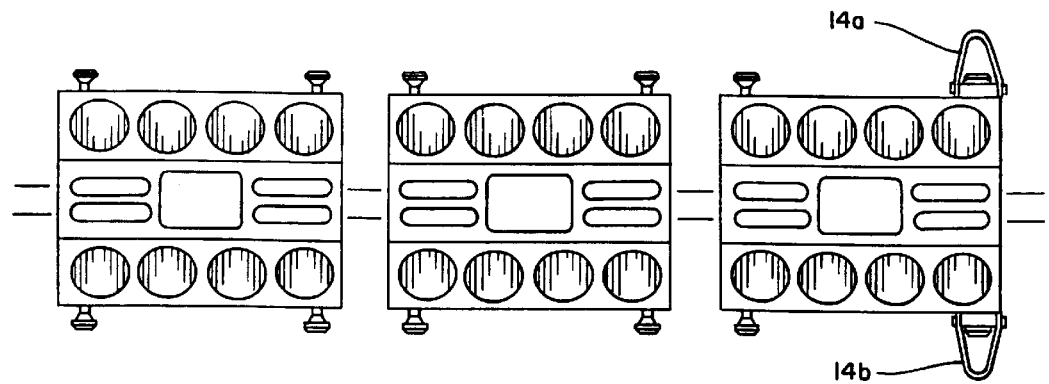
FIG. 7 is a top view of three loads with the anchor bushings installed and two swivel hangers adjacent but unattached to two of the installed anchor bushings.

FIG. 7 illustrates three workpieces with anchor bushings attached and two swivel hanger and shackle assemblies 14a and 14b in preparation for installation on the forward workpiece.

Figure 10:
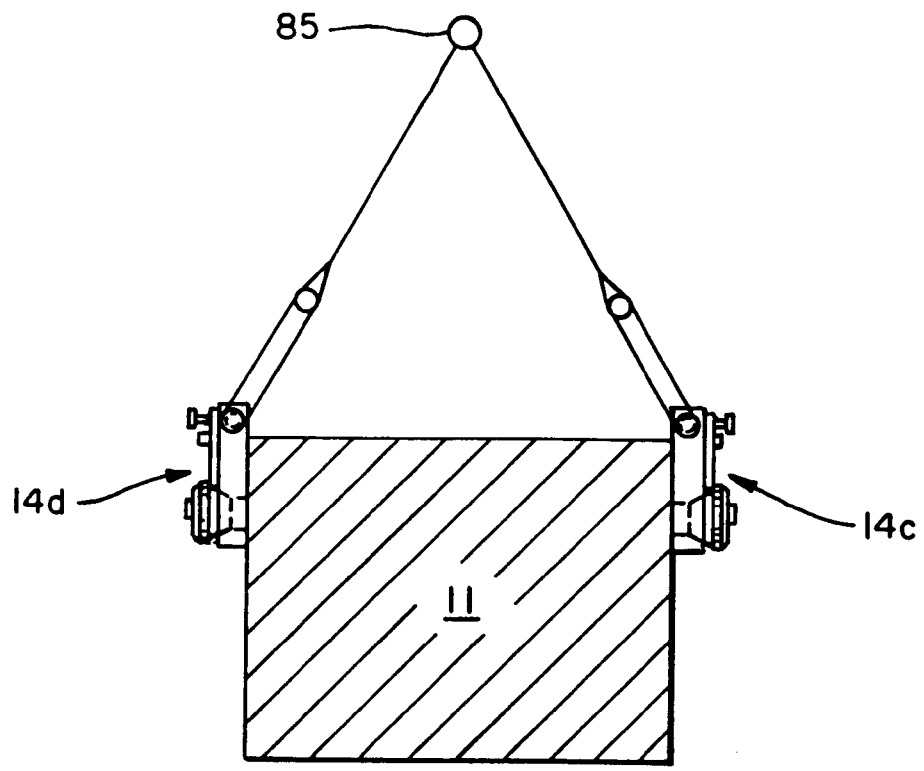
FIG. 10 is a side view of a load with two hoist ring assemblies in position.
Figure 11:
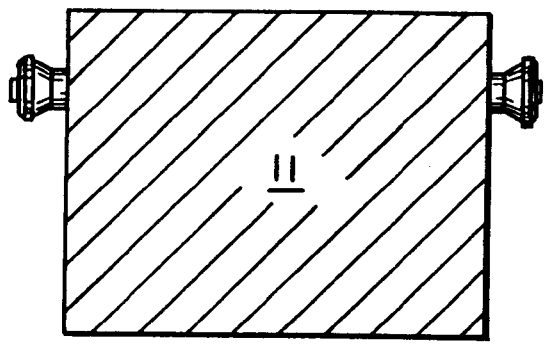
FIG. 11 is a side view of the load illustrated in FIG. 10 with the swivel hangers removed from the load.

FIG. 10 is a side view with two swivel hanger and shackle assemblies 14d and 14e attached to anchor bushings and a hoist 85, while FIG. 11 shows the same load as illustrated in FIG. 10 with the swivel hanger and latch assemblies 14d and 14e removed.

I claim:

1. A hoist ring assembly, comprising: an anchor bushing having a fastener adapted to connect to a load, a swivel member rotatable on the anchor bushing, quick release means interfitting the swivel member and the anchor bushing permitting the swivel member to be quickly attached and detached to the anchor bushing, and a shackle pivotally mounted to the swivel member, said swivel member being a hanger lying in a plane transverse to a longitudinal axis of the anchor bushing, said quick release means being operable by sliding the hanger in its own plane.

2. A hoist ring assembly as defined in claim 1, wherein the quick release means include a two width key hole slot in the swivel member.

3. A hoist ring assembly as defined in claim 1, including a swivel lever for selecting blocking movement of the swivel member from its attached position on the anchor bushing.

4. A hoist ring assembly, comprising: an anchor bushing having a threaded member to fix the anchor bushing to a load to be moved, a swivel hanger being generally planar in a plane perpendicular to the axis of the anchor bushing and mounted on the anchor bushing for swiveling movement about the axis of the anchor bushing, and a shackle pivotally mounted on the swivel hanger about an axis lying in the same plane as the swivel hanger, and quick release means for rapidly attaching and removing the swivel hanger from the anchor bushing, said quick release means including said swivel hanger lying in a plane transverse to a longitudinal axis of the anchor bushing, said quick release means being operable by sliding the hanger in its own plane.

5. A hoist ring assembly as defined in claim 4, wherein the quick release means includes a key hole slot in the swivel hanger lying in the same plane as the swivel hanger.

6. A hoist ring assembly, comprising: an anchor bushing having a threaded member to fix the anchor bushing to a load to be moved, a swivel hanger being generally planar in a plane perpendicular to the axis of the anchor bushing and mounted on the anchor bushing for swiveling movement about a longitudinal axis of the anchor bushing, and a shackle pivotally mounted on the swivel hanger about an axis lying in the same plane as the swivel hanger, and quick release means for rapidly attaching and removing the swivel hanger from the anchor bushing, said quick release means including a key hole slot in the swivel hanger lying in the same plane as the swivel hanger, said key hole slot including a lower portion for closely receiving the anchor bushing and an enlarged upper portion that permits passage over the anchor bushing.

7. A hoist ring assembly as defined in claim 6, including a pivotal latch on the swivel hanger for blocking movement of the anchor bushing from the lower portion of the key hole slot in the swivel hanger.

8. A hoist ring assembly as defined in claim 7, including means for holding the pivotal latch in both a blocking position and an anchor bushing passing position.

9. A hoist ring assembly as defined in claim 7, wherein the latch is pivotal in a plane parallel to the plane of the swivel hanger.

10. A hoist ring assembly as defined in claim 4, wherein the anchor bushing and the swivel hanger have complementary frusto-conical mating surfaces to axially lock the swivel hanger on the anchor bushing.

11. A hoist ring assembly, comprising: an anchor bushing having a threaded portion adapted to fix the anchor bushing to a load, a generally planar swivel hanger rotatably mounted on the anchor bushing and extending in a plane generally perpendicular to a longitudinal axis of the anchor bushing, said swivel hanger having a key hole slot therein for releasably receiving the anchor bushing, said key hole slot having a lower slot portion that closely receives the anchor bushing in an attached position and an upper enlarged portion that permits removal of the swivel hanger from the anchor bushing, and a shackle pivotally mounted to the swivel hanger about an axis laterally spaced a substantial distance from the axis of the anchor bushing and generally parallel to the plane of the swivel hanger.

12. A hoist ring assembly as defined in claim 11, including a latch member pivotally mounted on the swivel hanger above the upper enlarged portion and extendible over the upper enlarged portion to block movement of the anchor bushing into the upper enlarged portion.

* * * * *